US008199680B2

(12) United States Patent
Cai et al.

(10) Patent No.: US 8,199,680 B2
(45) Date of Patent: Jun. 12, 2012

(54) CORRELATING CALLS AFTER A REFERRAL

(75) Inventors: Yuan Cai, Campbell, CA (US);
Shuojiun Wu, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1314 days.

(21) Appl. No.: 11/673,495

(22) Filed: Feb. 9, 2007

(65) Prior Publication Data

US 2008/0192730 A1    Aug. 14, 2008

(51) Int. Cl.
| H04L 12/16 | (2006.01) |
| H04L 12/66 | (2006.01) |
| H04L 12/28 | (2006.01) |
| H04L 12/56 | (2006.01) |
| H04Q 11/00 | (2006.01) |
| H04B 3/30 | (2006.01) |
| H04M 1/24 | (2006.01) |
| H04M 3/08 | (2006.01) |
| H04M 3/22 | (2006.01) |
| H04M 11/00 | (2006.01) |
| H04M 7/00 | (2006.01) |
| H04M 3/42 | (2006.01) |
| G06F 15/16 | (2006.01) |

(52) U.S. Cl. ........ 370/262; 370/263; 370/285; 370/353; 370/354; 370/355; 370/356; 370/401; 379/1.02; 379/1.04; 379/93.21; 379/221.01; 379/221.05; 379/221.07; 379/221.11; 455/414.1; 709/204

(58) Field of Classification Search .................. None
See application file for complete search history.

(56) References Cited

U.S. PATENT DOCUMENTS

| 6,188,761 | B1 * | 2/2001 | Dickerman et al. ..... 379/265.01 |
| 6,892,230 | B1 * | 5/2005 | Gu et al. ..................... 709/220 |
| 7,680,481 | B2 | 3/2010 | Ejzak et al. |
| 2006/0245574 | A1 * | 11/2006 | Phelps et al. ................. 379/229 |
| 2008/0089344 | A1 * | 4/2008 | Jansson et al. ............. 370/395.2 |

OTHER PUBLICATIONS

Session Initiation Protocol (SIP) Call Control-Conferencing for User Agents, A. Johnston et al. Published Aug. 2006, RFC 4579.*
SPARKS, The Session Initiation Protocol (SIP) Refer Method, RFC 3515, Apr. 2003, pp. 1-20, The Internet Society.

* cited by examiner

Primary Examiner — Nishant B Divecha
(74) Attorney, Agent, or Firm — Stolowitz Ford Cowger LLP

(57) ABSTRACT

In one embodiment, a network device attaches a header including an identifier for an original call to an outgoing refer message and may also modify a table entry for a consultative call to include the identifier. The network device then monitors incoming invite messages for a header containing the identifier and observes that an incoming invite message containing the header correlates to the original call. When a header is not included, the network device extracts information from the incoming invite messages and compares the extracted information to the modified table entry to correlate one of the incoming invite messages to the original call.

10 Claims, 5 Drawing Sheets

CORRELATING CALLS AFTER A REFERRAL

TECHNICAL FIELD

The present disclosure relates generally to the field of networking.

BACKGROUND

Session establishment protocols such as Session Initiation Protocol (SIP) can be used to establish a call between two endpoints. The SIP protocol includes a referral method that allows a transferor to "transfer" a phone call to a transfer target. Under the SIP refer method the transferor establishes a consultative call with the transfer target to determine whether the transfer target will accept a transfer. When the transfer target indicates that the transfer is acceptable, the transferor sends a SIP refer message that includes information about the transfer target to a transferee. The SIP refer message elicits a SIP invite sent from the transferee to the transfer target, which establishes a call between the transferee and the transfer target.

When a Private Branch eXchange (PBX) or other network device for the transferor observes the incoming SIP invite, the PBX is unable to recognize that a new call established with the SIP invite is really a continuation of an original call established with the same remote endpoint. The inability of the PBX to correlate the two calls makes it difficult for a business to track efficiency. For example, a customer service center may need to determine how much time was spent addressing a single request from a customer, which may appear as two requests to the PBX when SIP refer method is used. The disclosure that follows solves these and other problems.

DESCRIPTION OF EXAMPLE EMBODIMENTS

Overview

Figure 1:
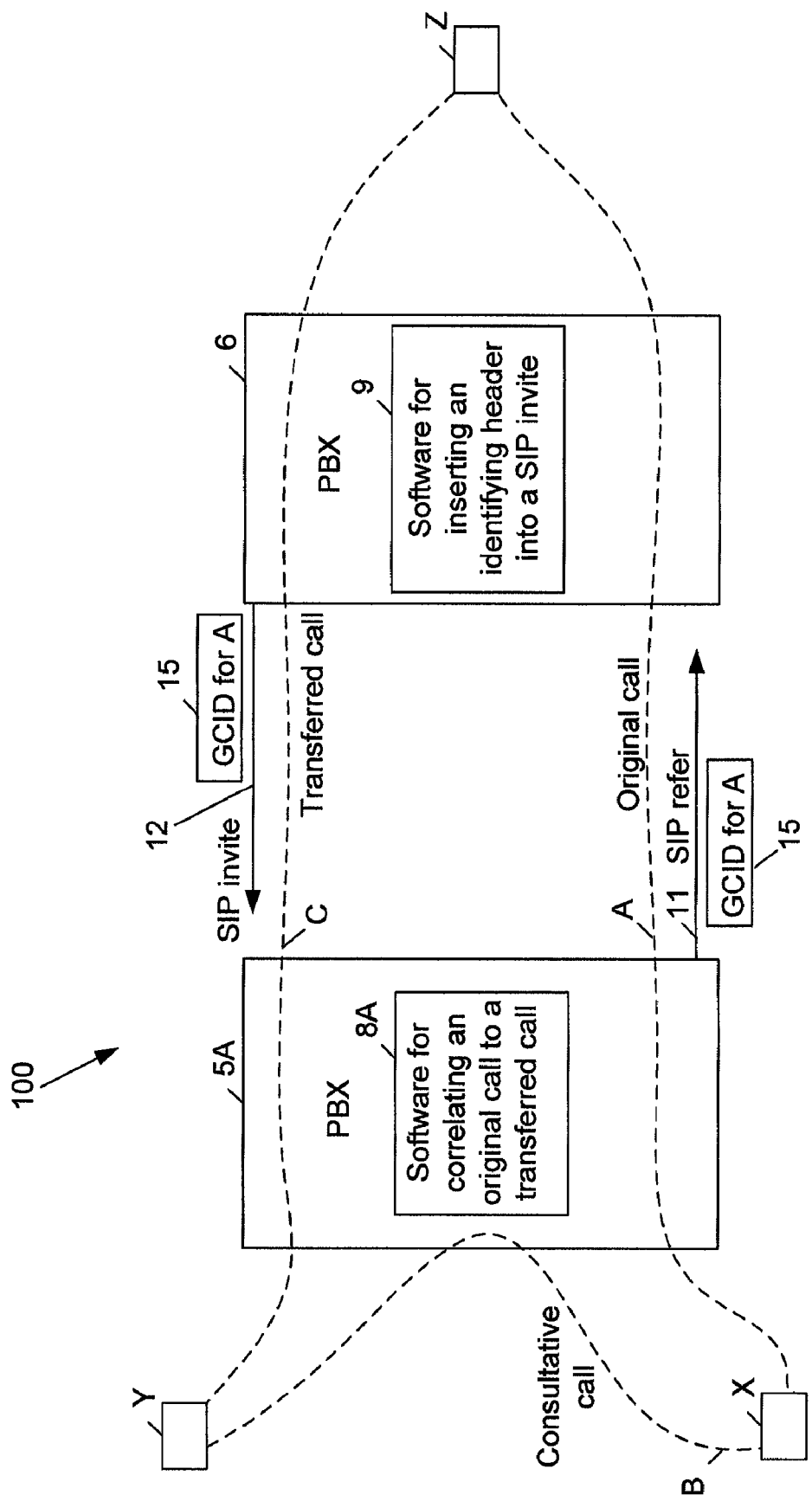
FIG. 1 illustrates an example Private Branch eXchange (PBX) for correlating an original call to a transferred call.

In one embodiment, a network device attaches a header including an identifier for an original call to an outgoing refer message and may also modify a table entry for a consultative call to include the identifier. The network device then monitors incoming invite messages for a header containing the identifier and observes that an incoming invite message containing the header correlates to the original call. When a header is not included, the network device extracts information from the incoming invite messages and compares the extracted information to the modified table entry to correlate one of the incoming invite messages to the original call.

Description

Several preferred examples of the present application will now be described with reference to the accompanying drawings. Various other examples of the invention are also possible and practical. This application may be exemplified in many different forms and should not be construed as being limited to the examples set forth herein.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears. When two elements operate differently, different reference numerals are used regardless of whether the two elements are the same class of network device.

Only those parts of the various units are shown and described which are necessary to convey an understanding of the examples to those skilled in the art. Those parts and elements not shown are conventional and known in the art.

FIG. 1 illustrates an example Private Branch eXchange (PBX) for correlating an original call to a transferred call.

The system 100 includes a PBX 5A including software 8A for correlating an original call A to a transferred call C and a PBX 6 including software 9 for inserting an identifying header into an invite message. The PBX 5A is a telephone exchange that serves endpoints X and Y, while the PBX 6 serves endpoint Z. In other embodiments, any other network device that exchanges or switches calls for endpoints may instead perform the functions of PBXs 5A and 6.

A customer service agent at the endpoint X located in a customer call center has established a call A with a customer located at the remote endpoint Z. During this original call A, the customer agent at the endpoint X decides to transfer the customer to a different agent at endpoint Y. Accordingly, the agent at endpoint X presses a key or takes some other action that causes the PBX 5A to establish a consultative call B with the endpoint Y.

Once the consultative call B has been established and the agent at endpoint X verifies that the agent at endpoint Y is available to take the call, the agent at endpoint X presses a hook flash key or takes some other action to signal the PBX 5A to transfer the customer to the agent at endpoint Y.

In response to the request from endpoint X, the PBX 5A generates a Session Initiation Protocol (SIP) refer 11 or any other refer message for sending to the endpoint Z. The SIP refer 11 is configured to trigger a SIP invite 12 or other invitation to be sent back, which is used for transferring as described in Request For Comment (RFC) 3515. The RFC 3515 is available on the Internet and herein incorporated by reference in its entirety.

According to the software 8A, the PBX 5A first identifies or assigns a Global Call IDentifier (GCID) 15 or any other call identifier for the original call A. The PBX 5A may identify the GCID 15 by accessing a local table that tracks active calls or by using any other method. Next, the PBX 5A formats a header including this GCID 15 for attaching to the SIP refer 11. The SIP refer 11 is then transferred to the PBX 6.

The PBX 6 receives the SIP refer 11 and generates a SIP invite 12. According to the software 9, the PBX 6 observes whether the SIP refer 11 includes a header having a GCID value. When the PBX 6 observes the GCID 15, the PBX 6 extracts either the header and the GCID 15 or just the GCID 15 from the SIP refer 11 and attaches the same or another header and the GCID 15 to the generated SIP invite 12. The SIP invite 12 is then transferred to the PBX 5A.

The PBX 5A monitors for SIP invites having attached GCID values according to the software 8A. When the PBX 5A observes the SIP invite 12, the PBX 5A causes the call C to be established between the endpoints Y and Z according to the SIP invite 12. According to software 8A, the PBX 5A correlates the newly established call C with the original call A according to the GCID 15 that identifies the call A. The PBX 5A may then update a database to reflect that calls A and C correspond to a same customer issue. This correspondence information may be used by the customer service center to identify how much total time is spent addressing each single customer issue, and to generate other similar statistics.

Figure 2:
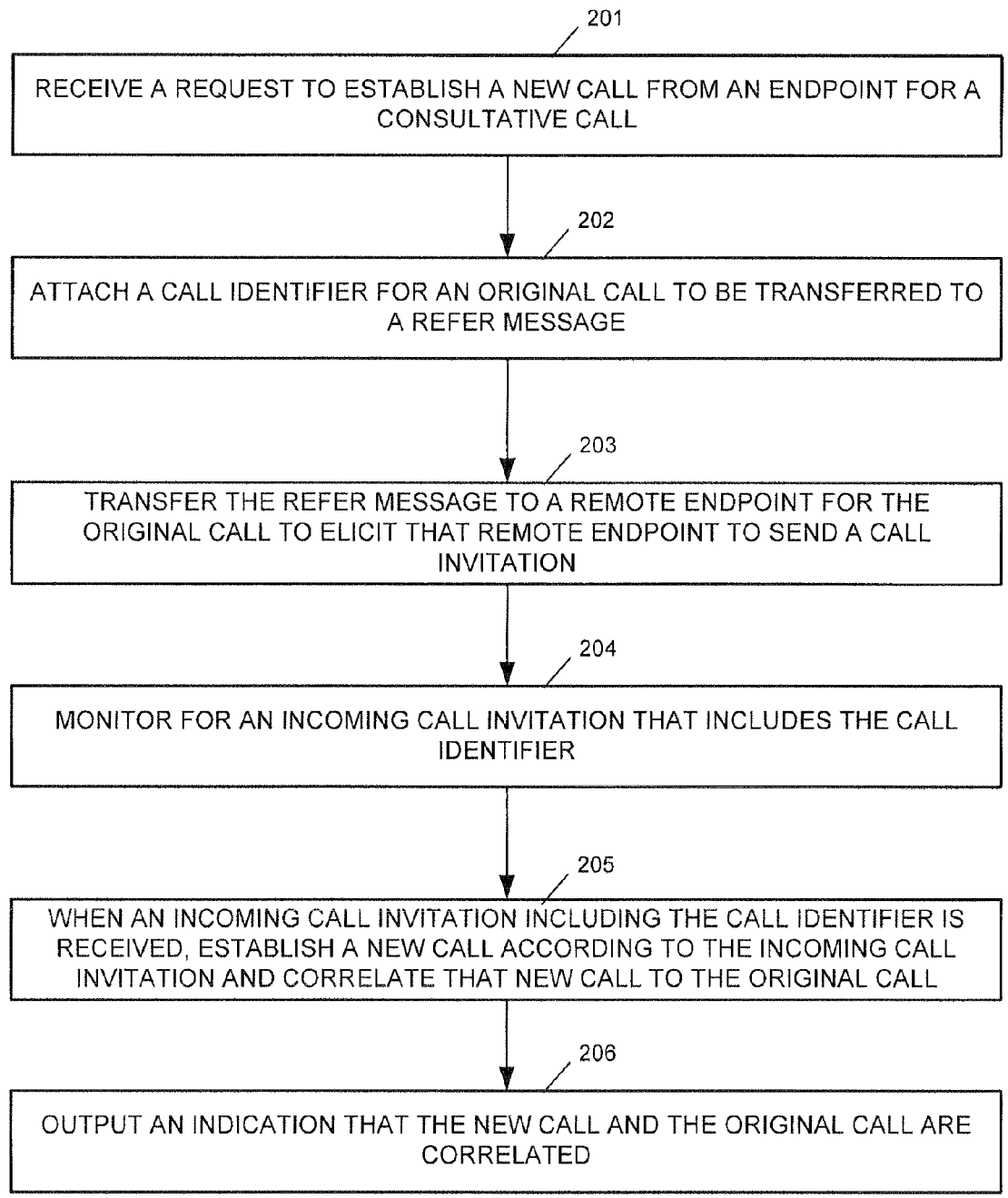
FIG. 2 illustrates an example method for using the PBX illustrated in FIG. 1.

FIG. 2 illustrates an example method for using the PBX illustrated in FIG. 1.

In block 201, the PBX 5A receives a request to establish a new call, which is sent from an endpoint for a consultative call. The PBX 5A attaches to a refer message a call identifier for an original call to be transferred in block 202. In block 203, the PBX 5A transfers the refer message with the attached call identifier to a remote endpoint for the original call to elicit that remote endpoint to send a call invitation.

In block 204, the PBX 5A monitors for an incoming call invitation that includes the call identifier for the original call. When an incoming call invitation including the call identifier is received, in block 205 the PBX 5A establishes a new call according to the incoming call invitation and correlates that new call to the original call. In block 206, the PBX 5A outputs an indication that the new call and the original call are correlated, which may be used for evaluating performance of a customer service center. The PBX 5A may output the indication by displaying the indication or transferring the indication for display on another device.

Figure 3:
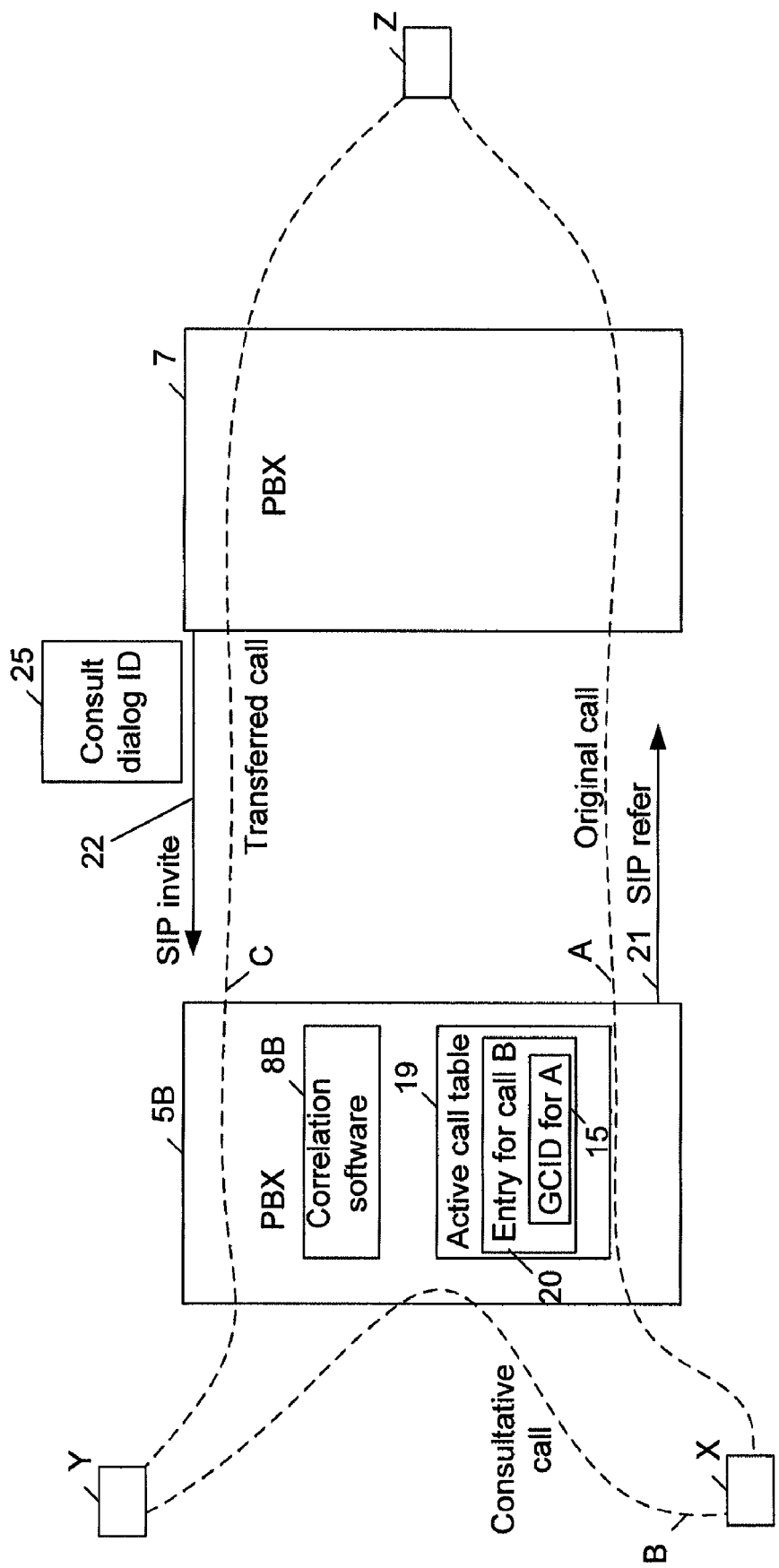
FIG. 3 illustrates another example PBX for correlating an original call to a transferred call.

FIG. 3 illustrates another example PBX for correlating an original call to a transferred call.

The embodiment show in FIG. 3 functions regardless of whether a network device for the remote endpoint includes the software 9 (FIG. 1) for inserting an identifying header, or even whether the remote endpoint is served by a network device such as PBX 7. In other words, the PBX 7 does not include the software 9 (FIG. 1) and thus does not attach the identifying header to a SIP invite. Therefore, PBX 5B uses a different technique for correlating the original call A to the transferred call C.

In conjunction with establishing the consultative call B, the PBX 5B includes an entry 20 for the call B in an active call table 19. According to correlation software 8B the PBX 5B formats the entry 20 to include the GCID 15 for the original call A. The GCID 15 may be included in the private data space of entry 20 for the call B.

The PBX 5B also sends the SIP refer 21 to elicit the SIP invite 22. The PBX 7 (or another network device such as a phone on endpoint Z) generates the SIP invite 22 according to the SIP refer 21.

Included within the SIP invite 22 is the consult dialog ID 25 for consultative call B. The consult dialog ID 25 is included within the SIP invite 22 according to the SIP refer method, which allows the PBX 5B to identify a consultative call to replace with the new call C requested by the SIP invite 22.

The PBX 5B receives the SIP invite 22, and according to the software 8B, examines the invite 22 to locate the consult dialog ID 25. In other examples, the PBX 5B may examine the invite 22 for other call replacement information that identifies the consultative call B. The PBX 5B compares the consult dialog ID 25 that identifies the consultative call B to the active call table 19 to identify entry 20. The PBX 5B then examines the private data space of the entry 20 to identify the GCID 15 corresponding to call A. Accordingly, the PBX 5B observes that the new call C correlates with the call A. The PBX 5B may store this observation in a local memory or may output this information so that, for example, a call center can recognize that the calls A and C correspond to a single customer issue.

In some embodiments, the functionality of both the software 8A (FIG. 1) and the software 8B (FIG. 3) is included in a single device so that calls can be correlated regardless of pre-knowledge of the capabilities of a remote network device. In other words, a network device may both attach an identifying header and format a table entry and then both examine an invite message for an identifying header and compare call replacement information to the formatted table entry. Such an embodiment is interoperable with a wide variety of remote network devices.

Figure 4:
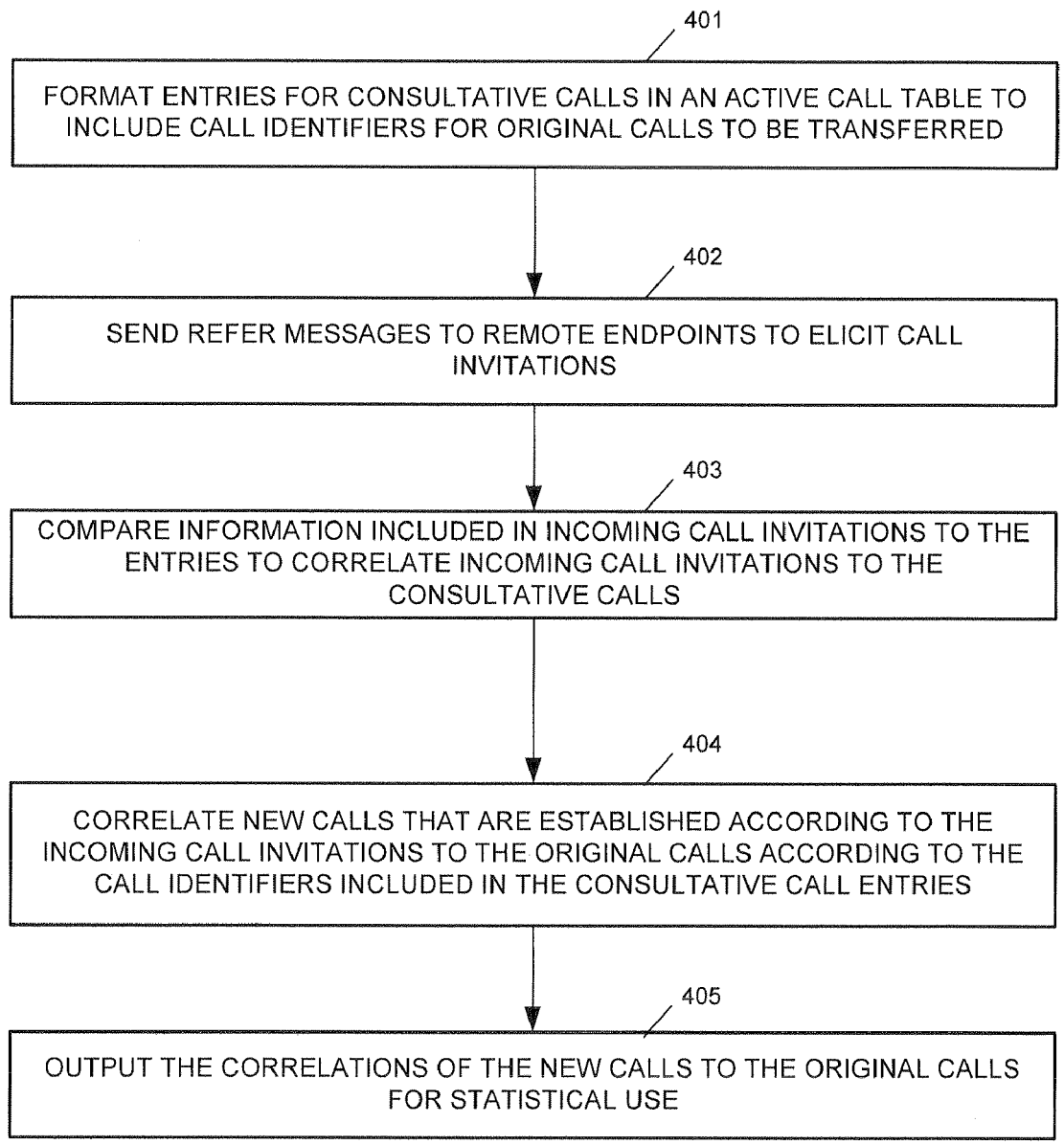
FIG. 4 illustrates an example method for using the PBX illustrated in FIG. 2.

FIG. 4 illustrates an example method for using the PBX illustrated in FIG. 3.

In block 401, the PBX 5B formats entries for consultative calls in an active call table to include call identifiers for original calls to be transferred. In block 402, the PBX 5B sends refer messages to remote endpoints to elicit call invitations.

In block 403, the PBX 5B compares information included in incoming call invitations to the entries to correlate incoming call invitations to the consultative calls. The PBX 5B then correlates new calls that are established according to the incoming call invitations to the original calls using the call identifiers included in the consultative call entries in block 404. The PBX 5B may output the correlations of the new calls to the original calls for statistical use in evaluating the performance of a customer service center in block 405.

Figure 5:
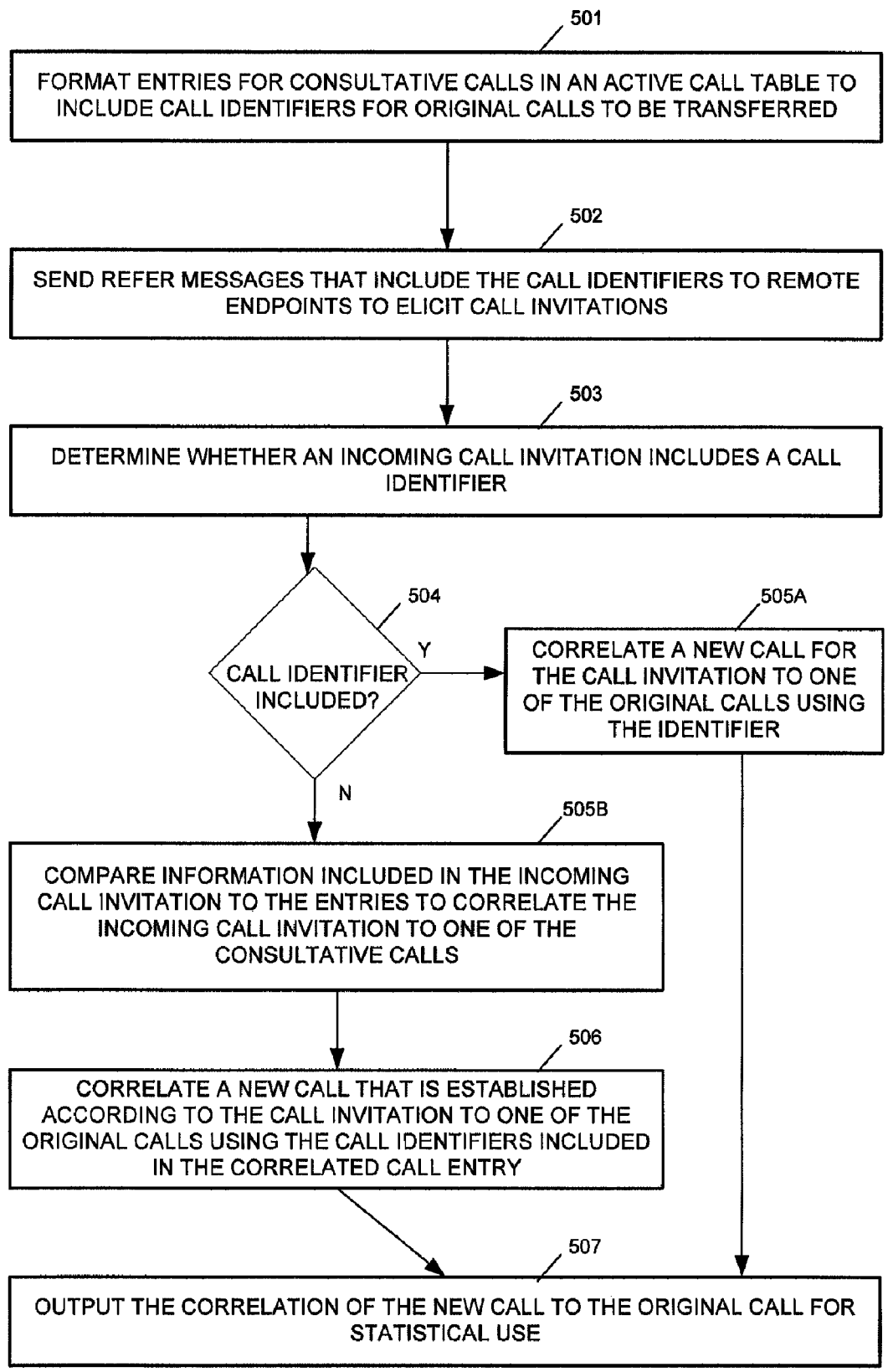
FIG. 5 illustrates an example method for using a network device that includes the functionality of the PBXs illustrated in FIGS. 1 and 3.

FIG. 5 illustrates an example method for using a network device that includes the functionality of the PBXs illustrated in FIGS. 1 and 3.

In block 501, the network device formats entries for consultative calls in an active call table to include call identifiers for original calls to be transferred. In block 502, the network device sends refer messages that include the call identifiers to remote endpoints to elicit call invitations.

In block 503, the network device determines whether an incoming call invitation includes a call identifier. When the call identifier is included in block 504, the network device correlates a new call established using the call invitation to one of the original calls using the call identifier in block 505A. In block 507, the network device may output the correlation of the new call to the original call for statistical use.

When the call identifier is not included in block 504, the network devices compares information included in the incoming call invitation to the entries to correlate the incoming call invitation to one of the consultative calls in block 505B. In block 506, the network device correlates a new call that is established using the call invitation to one of the original calls using the call identifier included in the correlated call entry. The network device may also output the correlation of the new call to the original call for statistical use in block 507.

Several preferred examples have been described above with reference to the accompanying drawings. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown are conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. An apparatus, comprising:
  one or more processors; and
  a memory coupled to the one or more processors comprising instructions executable by the one or more processors, when executing the instructions, the one or more processors configured to:
  pass user data between a first endpoint and a second endpoint during a first voice call;
  receive, during the first voice call, a Session Initiation Protocol (SIP) refer message from one of the first and second endpoints, the incoming SIP refer message configured to cause the other one of the first and second endpoints to send a SIP invite to a third endpoint for establishing a second voice call between the third endpoint and only the other one of the first and second endpoints;
  attach a call identifier having a value for the first voice call to the SIP refer message and pass the SIP refer message having the attached identifier to a remote device;
  monitor incoming SIP invites for the value to distinguish the SIP invite originating from the other one of the first and second endpoints and resulting from the SIP refer message from other received SIP invites; and
  in response to observing the value in the SIP invite from the other one of the first and second endpoints, store in a database a correlation between the second voice call between the third endpoint and only the other one of the first and second endpoints to the first voice call between the first and second endpoints;
  wherein the correlation of the second voice call with the first voice call indicates that both the first voice call and the second voice call represent a single customer issue;
  wherein the one or more processors are further configured to output the correlation of the first voice call with the second voice call for use in calculating efficiency trends of a call center that is an endpoint for the first voice call and the second voice call.

2. The apparatus of claim 1, wherein the call identifier is a Global Call IDentifier (GCID).

3. The apparatus of claim 1, wherein the one or more processors are further configured to:
  generate an entry in an active call table for the first voice call, the generated entry including the value;
  compare information from consult dialog information fields of the incoming SIP invites to the active call table to distinguish the SIP invite originating from the other one of the first and second endpoints and resulting from the SIP refer message from the other received SIP invites; and
  store in the database the association between the second voice call between the third endpoint and only the other one of the first and second endpoints to the first voice call between the first and second endpoints.

4. The apparatus of claim 1, wherein none of the first, second, and third endpoints are a same endpoint.

5. A method, comprising:
  passing user data between a first endpoint and a second endpoint during a first voice call;
  receiving, during the first voice call, a refer message from one of the first and second endpoints, the incoming refer message configured to cause the other one of the first and second endpoints to send an invite to a third endpoint for establishing a second voice call between the third endpoint and only the other one of the first and second endpoints;
  generating an entry in an active call table for the first voice call, the generated entry including a value for the first voice call;
  comparing information from consult dialog information fields of incoming invites to the active call table to correlate a particular one of the incoming invites to the generated entry; and
  based on the correlation, storing in a database an association between the second voice call between the third endpoint and only the other one of the first and second endpoints to the first voice call between the first and second endpoints;
  wherein the correlation of the second voice call with the first voice call indicates that both the first voice call and the second voice call represent a single customer issue;
  outputting the correlation of the first voice call with the second voice call for use in calculating efficiency trends of a call center that is an endpoint for the first voice call and the second voice call.

6. The method of claim 5, wherein the value is a Global Call IDentifier (GCID) stored in a private data space of the entry in the active call table.

7. The method of claim 6, wherein the active call table includes other entries for other types of active calls.

8. The method of claim 5, wherein the refer message is a Session Initiation Protocol (SIP) refer.

9. The method of claim 5, wherein the particular incoming invite is a SIP invite.

10. An apparatus, comprising:
  one or more processors; and
  a memory coupled to the one or more processors comprising instructions executable by the one or more processors, when executing the instructions, the one or more processors configured to:
  pass user data between a first endpoint and a second endpoint during a first voice call;
  receive, during the first voice call, a Session Initiation Protocol (SIP) refer message from one of the first and second endpoints, the incoming SIP refer message configured to cause the other one of the first and second endpoints to send a SIP invite to a third endpoint for establishing a second voice call between the third endpoint and only the other one of the first and second endpoints;

attach a call identifier having a value for the first voice call to the SIP refer message;

observe a value associated with the first voice call in response to receiving the SIP refer message and pass the SIP refer message having the attached identifier to a remote device;

monitor incoming SIP invites for the value to distinguish the SIP invite originating from the other one of the first and second endpoints and resulting from the SIP refer message from the other received SIP invites;

analyze information contained in the incoming SIP invites, the analysis utilizing the value observed in response to receiving the SIP refer message in order to correlate a particular one of the incoming SIP invites to the first voice call; and based on the correlation, store in a database an association between the second voice call between the third endpoint and only the other one of the first and second endpoints to the first voice call between the first and second endpoints;

wherein the correlation of the second voice call with the first voice call indicates that both the first voice call and the second voice call represent a single customer issue;

wherein the one or more processors are further configured to output the correlation of the first voice call with the second voice call for use in calculating efficiency trends of a call center that is an endpoint for the first voice call and the second voice call.

* * * * *